Oct. 4, 1938.  E. SEIDL  2,131,979
APPLIANCE FOR TESTING VEHICLE TIRES AND ROAD SURFACES
Filed June 15, 1936  2 Sheets-Sheet 1

Inventor:
Erich Seidl
By: Glascock Downing & Seebold
Attys.

Oct. 4, 1938.  E. SEIDL  2,131,979
APPLIANCE FOR TESTING VEHICLE TIRES AND ROAD SURFACES
Filed June 15, 1936  2 Sheets-Sheet 2

Inventor:
Erich Seidl
By: Glascock Downing & Seebold
Attys.

Patented Oct. 4, 1938

2,131,979

UNITED STATES PATENT OFFICE 2,131,979

APPLIANCE FOR TESTING VEHICLE TIRES AND ROAD SURFACES

Erich Seidl, Berlin-Westend, Germany

Application June 15, 1936, Serial No. 85,388
In Germany June 15, 1935

3 Claims. (Cl. 73—51)

Apart from experimental streets, roundabout testing appliances have heretofore been used for testing the behaviour of street coverings when traversed by motor vehicles. In these appliances the experimental street is constructed in the form of a flat ring on which runs the roundabout or carrier provided with three or more wheels. The axis of rotation of the roundabout is arranged so as to be vertical to the plane of the track. A grave disadvantage of such a testing appliance is that it can be used only at comparatively small rates of travel, up to about 30 km. per hour. At higher rates of travel the tires are stressed by centrifugal forces which act vertically with respect to the middle plane of the running wheel and are many times larger than the centrifugal forces which arise on travelling round curves, and impose on the tire in an axial direction a heavy stress which does not correspond to working conditions, and may lead to premature destruction of the tire.

In the modern development of vehicular traffic however it is just the behaviour of the road and the tire at the maximum speeds which comes into question at all. Velocities come into consideration such as are attained in racing, and which lie therefore between 300 and 400 km. per hour. The known roundabout or rotary carrier method of testing is quite unsuitable for carrying out investigations of this kind.

Figure 1:
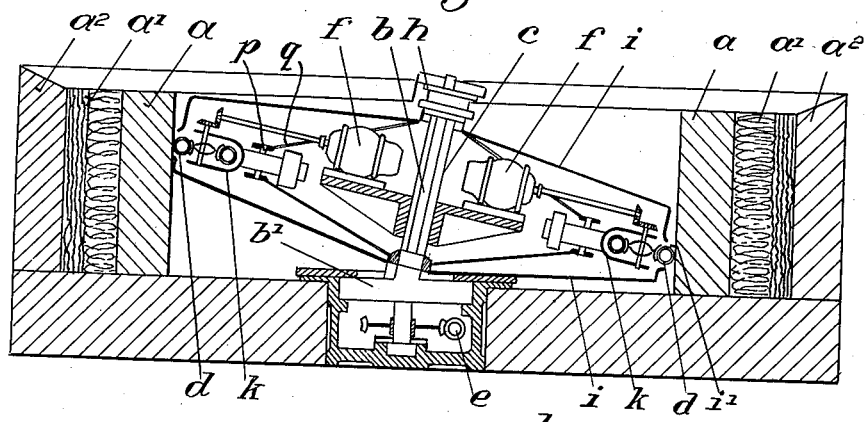
Figure 2:
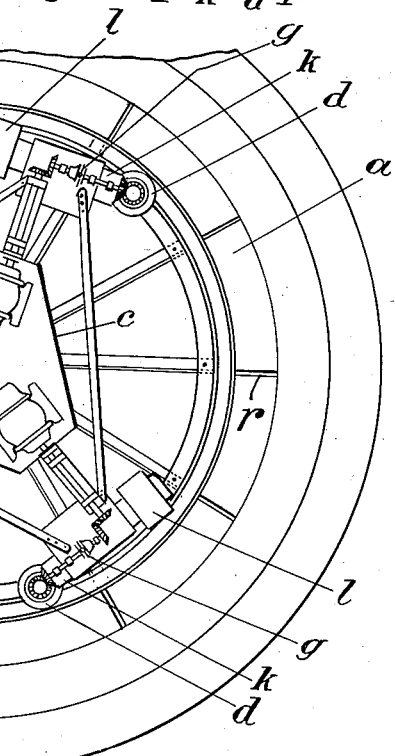

The object of this invention is to provide a device by means of which the tire and the track can be tested up to speeds of any desired magnitude. In Figures 1 and 2 of the accompanying drawings one constructional form of the appliance provided by the invention is shown by way of example, Figure 1 showing a sectional elevation and Figure 2 a plan view of the testing appliance.

The experimental track $a$ is not arranged in the form of a flat circular ring as heretofore, but it advantageously has the shape of a hollow cylinder with an upright or vertical axis. The travel track may be made as a closed circular ring of for example concrete or ferroconcrete, on which a coating of asphalt, metalling and so forth may then be disposed.

The actual conditions however are better set up during the test if the travel track is assembled from individual segments, between which air gaps $r$ are left and behind which are disposed in any desired manner as support the substances used in practical street construction. This filling $a^1$ is situated between the exterior wall $a^2$ of the testing stand or structure, which consists of ferroconcrete or masonry and is very rigidly made, and the segments forming the experimental travel track. The substances for the rear lining may be chosen as desired corresponding to the practical working conditions of roads, for example as tightly packed insertion, broken stones with sand or soil sub-support, peat and so forth. By means of this arrangement the natural springiness of roads can be imitated to a very large extent during the testing.

The runner or carriage on which the running wheels being tested are arranged and which runs inside the travel track shaped like a hollow cylinder is constructed as follows:

The shaft $b$ of the runner or carriage is fixed in a foot plate $b^1$. This is mounted in a housing which is fixed in the ground surface of the testing appliance. This foot plate may be set into rotation with the aid of a worm drive $e$, which is preferably driven by means of a separate motor. The shaft $b$ is so disposed on the foot plate that it forms an angle with the middle axis thereof and consequently also with the axis of the hollow cylinder forming the travel track. The revolving frame $c$ is an iron or girder construction in which the driving motors $f$ for the running wheels $d$ are arranged. In order to decrease air resistance as far as possible the revolving frame is jacketed with sheet metal $i$ so that, viewed from the exterior, it presents somewhat of a lenticular form. The openings $i^1$ out of which the running wheels project are jacketed in a streamline manner. The wheels $d$ being examined are arranged at the end of forks or levers $k$ which are capable of moving in an articulate manner about rotary pins $p$ secured in the iron construction $q$.

Figure 3:
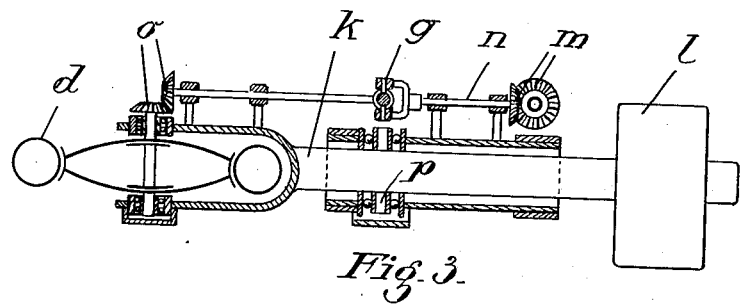
Figure 4:
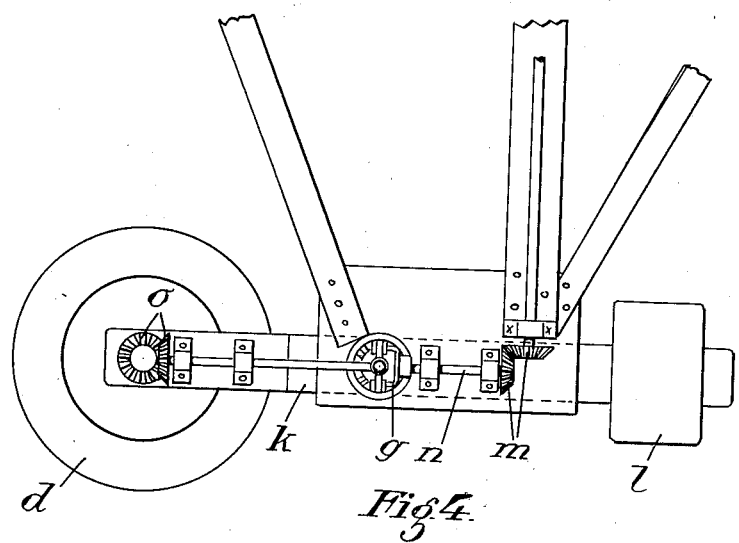

Details of this manner of driving are shown in Figure 3 in longitudinal section and in plan view in Figure 4.

The motor, to which the current is supplied by way of the slip ring $h$, drives an intermediate shaft $n$ through a bevel wheel or worm wheel drive $m$; the said intermediate shaft $n$ is firmly mounted in the running frame. The moment of rotation is transmitted from here through a Cardan shaft $g$ to a second bevel or worm wheel drive $o$ which is directly coupled with the running wheel $d$. Accordingly the lever $k$ in the running wheel can adjust itself in any desired position without the drive being hindered in any way. The wheels $d$ with the levers $k$ are so arranged that their middle sectional planes are vertical to the axis of the runner or carriage. As a result the centrifugal forces which arise during the motion act in this middle sectional plane so that there are no components which stress the tires vertically with respect to the middle planes of the wheels.

The levers are provided with counter weights $l$ which, if desired, can be adjusted during the drive after the manner of travelling weights. The powerful centrifugal forces which arise during the rotation of the device and which seek to force the running wheels against the travel track may thus be wholly or partly counterbalanced. The travelling weights are advantageously adjusted, or regulated during the rotation, such that the force of the pressure against the travel track is about equal to the fraction of the weight of an actual vehicle bearing on the running wheel.

The inclined position of the shaft $b$ about which the framework revolves has the purpose of avoiding wear of the experimental track at one place. If the foot plate to which the shaft is fastened is set into slow rotation with the aid of the worm drive $e$ then the path of the running wheels on the experimental track travels through a corresponding amount and single grooves cannot form on the travel track. On the contrary a wide band is traversed during the test within which the path of the running wheels is continuously displaced. By varying the rate at which the foot plate is rotated as compared with the speed of rotation of the runner or carriage the wear of the travel track can be affected in various ways. In a limiting case for example for one complete rotation of the foot plate there may be 100 or even more rotations of the revolving frame or carriage, whilst in another case there may be only 5 to 10.

The testing appliance can also be used to investigate the springing properties of racing vehicles.

This specification describes only one constructional form of the appliance according to this invention which can be varied in any desired manner. With all constructional forms however it must be borne in mind that the centrifugal forces set up by the rotation must fall wholly or for the most part in the middle sectional planes of the running wheels and that the pressure with which the wheels are loaded by the centrifugal forces is relieved wholly or partly by means of a counterbalancing or compensating arrangement such that the pressure with which the wheels are forced against the travel track can be regulated to a nicety.

What I claim is:

1. An appliance for testing vehicle tires and road surfaces, more particularly at very high rates of travel, comprising in combination a carrier adapted to rotate about an upright axis which is inclined to the vertical, means for causing this axis to sweep out a conical surface, a plurality of testing wheels mounted on said carrier with their axes of rotation parallel to said upright axis for accommodating the tires being tested, means on said carrier for driving said testing wheels about their axes, and, surrounding said carrier, an upright running track bearing the road surface being tested on which the testing wheels run.

2. An appliance for testing vehicle tires and road surfaces, more particularly at very high rates of travel, comprising in combination a carrier adapted to rotate about an upright axis which is inclined to the vertical, means for causing this axis to sweep out a conical surface, a plurality of levers pivoted on said carrier, a testing wheel mounted on one arm of each lever with its axis of rotation parallel to the upright axis of the carrier for accommodating the tires being tested, a counterweight mounted on the other arm of each lever for balancing the centrifugal force set up by the wheel when the carrier rotates, means on said carrier for driving said testing wheels about their axes, and, surrounding said carrier, an upright running track bearing the road surface being tested on which the testing wheels run.

3. An appliance for testing vehicle tires and road surfaces, more particularly at very high rates of travel, comprising in combination a carrier adapted to rotate about an upright axis, a plurality of forks mounted on the said carrier, a plurality of testing wheels symmetrically journaled in the said forks with their axes of rotation parallel to said upright axis for accommodating the tires being tested, electric motors and bevel gearing on said carrier adapted to drive said testing wheels about their axes at a peripheral speed of at least 150 kilometers per hour, and, surrounding said carrier, a vertical cylindrical running track bearing the road surface being tested on which the testing wheels run.

ERICH SEIDL.